United States Patent
Kallabis et al.

(10) Patent No.: US 7,771,074 B2
(45) Date of Patent: Aug. 10, 2010

(54) DEVICE AND METHOD FOR PROJECTING A MARKING ONTO A BOUNDARY

(75) Inventors: Gabriel Kallabis, Spirkelbach (DE); Daniel Busam, Godramstein (DE)

(73) Assignee: Stabila Messgerate Gustav Ullrich GmbH, Annweiler (DE)

( * ) Notice: Subject to any disclaimer, the term of this patent is extended or adjusted under 35 U.S.C. 154(b) by 569 days.

(21) Appl. No.: 11/741,065

(22) Filed: Apr. 27, 2007

(65) Prior Publication Data

US 2007/0262245 A1  Nov. 15, 2007

(30) Foreign Application Priority Data

May 5, 2006  (DE)  .................. 10 2006 021 421

(51) Int. Cl.
- *F21S 8/00* (2006.01)
- *G02B 27/20* (2006.01)
- *F21V 7/08* (2006.01)

(52) U.S. Cl. ............. 362/147; 362/259; 362/277; 362/296.01; 362/296.05; 362/309; 362/311.06; 362/327; 362/336; 362/337; 362/339; 362/343; 359/726; 359/798; 359/800; 359/809

(58) Field of Classification Search ........... 362/147, 362/257, 259, 277, 296.01, 296.05, 299, 362/307, 309, 311.06, 327, 335, 336, 337, 362/339, 341, 343; 359/726, 728, 737, 741, 359/742, 798, 800, 809
See application file for complete search history.

(56) References Cited

U.S. PATENT DOCUMENTS

| | | | |
|---|---|---|---|
| 3,984,154 A | 10/1976 | Chin et al. | |
| 5,772,306 A * | 6/1998 | Okuchi | ............ 362/336 |
| 6,502,319 B1 | 1/2003 | Goodrich | |
| 6,935,034 B2 | 8/2005 | Malard et al. | |

FOREIGN PATENT DOCUMENTS

| | | |
|---|---|---|
| DE | 19514626 | 10/1996 |
| DE | 69605266 | 12/1999 |
| DE | 10217108 | 12/2000 |
| DE | 19953114 | 5/2001 |
| DE | 20304114 | 5/2003 |
| DE | 20304117 | 5/2003 |
| DE | 202004007476 | 5/2004 |
| EP | 1054286 | 11/2000 |
| JP | 2004094163 | 3/2004 |

* cited by examiner

*Primary Examiner*—Evelyn A. Lester
(74) *Attorney, Agent, or Firm*—Dennison, Schultz & MacDonald

(57) ABSTRACT

The invention concerns a device for projecting a linear optical marking onto at least one boundary of a room, such as floor surface for example, comprising a light source (12) that emits laser radiation along an optical axis (16) as well as a cuboid lens (14) connected in series with the light source, penetrated by the optical axis and reflecting as well as refracting the radiation. To facilitate fanning and reflecting of light originating from the light source through constructively simple means, the invention proposes that provided in the frontal surface (20) is a channel-shaped depression (40) and provided in the rear surface (22) is a projection (24), both of which are geometrically designed and arranged so that the radiation can be totally reflected and that totally reflected radiation striking the depression can be fanned out, where the optical marking runs to both transverse surfaces of the lens.

27 Claims, 2 Drawing Sheets

DEVICE AND METHOD FOR PROJECTING A MARKING ONTO A BOUNDARY

BACKGROUND OF THE INVENTION

The invention concerns a device for projecting a linear optical marking onto at least a boundary of a room, such as a floor surface, comprising a light source that emits a light radiation—such as laser radiation—along an optical axis, as well as a cuboid lens connected in series with the light source, which is penetrated by the optical axis, both reflects and refracts the radiation, and features frontal and rear surfaces as transverse surfaces, which run at an angle to the optical axis. The invention also relates to a method for projecting a linear optical marking onto at least one boundary such as a floor surface of a room by fanning a light radiation, such as laser radiation, emitted from a light source and at least partly reflecting and refracting it at or in an optical lens, whereby radiation is reflected and refracted in such a way that the optical marking is projected both in front of and behind the light source.

DE-A-102 17 108 discloses a laser beam device for use in the construction industry. To generate a line running over a wide angle without interruption, the invention provides that a bundle of laser beams penetrating a collimator-lens strikes a rod lens that features a semitransparent surface on the side facing the light source for the purpose of reflecting a linear laser beam in the direction of the light source. The light that is not reflected then penetrates a fully transparent surface of the rod lens facing away from the light source and is refracted to produce a linear light beam in a second direction running in opposition to the first direction.

To solve the problem of projecting a line of visible light on a surface that begins immediately in front of a housing containing the light source, U.S. Pat. No. 6,502,319 provides multiple cylinder lenses and mirrors by means of which the light beam emitted from the light source is fanned to the extent required.

In light-beam leveling device disclosed in DE-U-203 04 117 and DE-U-203 04 114, line lenses, which are composed of sections of differing focal lengths, are arranged in front of a light source, by means of which a linear light beam should be produced.

To solve the problem of generating two lines intercepting at a right angle on a workpiece below an optical marking device, DE-C-199 53 114 proposes having two projection devices arranged laterally to one another, each of which comprises a light source and optics arranged in the optical path thereof.

To solve the problem of fanning out the light beam, U.S. Pat. No. 3,984,154 proposes a lens that features the shape of a hollow cylindrical body section, an edge face of which is struck by a collimated laser beam. To ensure the sufficient outward reflection of the light, the inner surface of the lens features a reflective layer.

To solve the problem of generating linear markings, JP-A-2004094123 uses a rod lens, where sections of the outer surface feature a reflective layer so that the light striking it is immediately reflected. In the areas in which this reflective layer is not provided, light is able to penetrate the lens.

A device of the type initially mentioned is known from U.S. Pat. No. 6,935,034. The lens used to fan out a laser beam is of cuboid geometry with a rounded edge facing away from the light source to facilitate the desired fanning of the light penetrating the lens.

To solve the problem of generating optical markings on an object, EP-A-1 054 286 proposes using two pivotably mounted reversing devices arranged in an optical path of a light bundle.

To solve the problem of forming and guiding a radiation field of one or more solid state lasers, DE-A-195 14 626 proposes using refractive elements, by means of which the striking radiation is reversed or refracted in one direction.

A lighting system, for example for motor vehicles or buildings, disclosed in EP-B-0 767 393 comprises a transparent plate with recesses and projections in the side surfaces, which run at an angle to the striking direction of the radiation of the lighting system. Owing to this design of the transparent plate, the reflected and refracted radiation exits the plate exclusively on the side facing away from the light source.

To solve the problem of generating crossing lines on, for example, a floor surface, DE-U-20 2004 007 476 proposes connecting channel-shaped lenses in series to light sources.

SUMMARY OF THE INVENTION

The present invention seeks to solve the problem of further developing a device or a process of the type initially mentioned so that, through constructively simple measures, the light, such as a laser beam, originating from the light source is fanned and reflected in such a way that an optical marking can be generated to the required extent in front of and in the immediate vicinity of the light source, where the optical marking is generated in particular on a floor surface to simplify the aligning of tiles, floor plates or other floor coverings to be laid, for example.

With this device, the problem is essentially solved by providing in at least one transverse surface a channel-shaped depression and in at least one transverse surface a projection, which are shaped and arranged in such a way that radiation striking the transitional area between the projection and transverse surface can be totally reflected, and totally reflected radiation and radiation striking the depression can be fanned, while the optical marking runs to both of the transverse surfaces of the lens. Thus it is provided in particular that the projection is provided on the rear surface facing away from the lens. The depression should be present on the frontal surface facing the lens. Furthermore, the projection should protrude beyond the transverse surface, specifically the rear surface.

In a preferred embodiment, the lens is composed of a first and second section, where the projection runs in the transitional area between the first and second section, the first section is of trapezoidal geometry in a sectional plane in which the optical axis runs, and the channel-shaped depression is provided in the second section.

To solve the problem of reflecting the radiation totally reflected by the projection to the desired extent in the direction of the frontal surface, the invention further provides that provided on the transverse surface featuring the projection, in this case the rear surface, an additional depression is provided, the border surface of which running on the side of the projection reflects light in the direction of the opposite transverse surface, in this case the frontal surface.

Separate from this, the second section of the lens emanating from the depressions should feature a trapezoidal geometry with a concavely running free outer base surface, which in particular constitutes the lower outer surface of the lens.

It is furthermore provided that outer free base surfaces of the first section are preferably designed as the planar upper outer surface of the lens and run parallel or nearly parallel to the horizontal axis when the lens is in operating position.

Alternatively, it is also possible for outer free base surfaces of the first section to be preferably composed as the upper outer surface of the lens from multiple planar surfaces, of which at least one runs horizontally or in essence horizontally when the lens is in operating position.

Independent of this, the frontal surface should run inclined toward the optical axis in the area of the first segment, so that the radiation striking it is refracted in such a way that the desired fanning occurs in the direction of the rear surface.

Furthermore, it is also provided that the lens is aligned with the light source so that the optical axis hits the first section at an angle α≠90°. In particular, the optical axis runs in relation to the horizontal axis at an angle less than β, where the angle β in particular is 1°≦β≦3°. Thus the optical axis should intersect the frontal surface at its area emanating from the upper outer surface of the lens at an obtuse angle.

The lens features a width B, a length L and a depth T, where in particular 2 B≦L≦3 B and/or 2 T≦L≦4 T and/or 1 T≦B≦2 T.

The projection should run in the center of the transverse surface and in particular should have an isosceles triangle-shaped cross section and span the entire width of the transverse surface. The apex is parallel or nearly parallel to the upper and to the lower outer surfaces, in this case the base and top surface, respectively, of the lens.

The transverse surface featuring the projection is preferably composed of a first area having an angle δ to the vertical axis when the lens is in operating position and a second area having an angle γ to the vertical axis when the lens is in operating position, where δ<γ. The projection should then emanate from the first area, and the second area should merge with the first area via a diagonally running surface.

The invention also provides that when the device is in operating position, the lens is arranged with its first depression reflecting the radiation back in the direction of the light source or fanning it spaced from the boundary at a distance A, where 20 mm≦A≦100 mm, in particular 30 mm≦A≦70 mm.

A process of the type initially described distinguishes itself in the fact that a cuboid lens with frontal and rear surfaces as transverse surfaces is used that runs at an angle to the optical axis of the radiation striking the lens, where in at least one transverse surface a channel-shaped depression and in at least one transverse surface a projection are provided that are geometrically designed and arranged in such a way that the radiation striking the transitional area between the projection and the transverse surface is totally reflected, and the totally reflected radiation striking the depression is fanned out. Here it is particularly provided that radiation from the projection running on the rear surface facing away from the lens is totally reflected in the transitional area between a first section of the rear surface and the projection, that radiation totally reflected in this way is totally reflected and fanned in the transitional area between the projection and a second section of the rear surface and that a portion of the fanned radiation is further reflected in the channel-shaped depression provided on the frontal surface facing the lens.

The projection and the bordering areas of the lens should be geometrically adapted to one another so that on a first transitional area between the projection and the bordering rear surface, radiation is totally reflected in a second transitional area between the projection and the bordering rear surface and is totally reflected by the second transitional area in the direction of the frontal surface. Here the light beam is directed onto the lens so that a portion of the radiation is reflected at the projection two times, namely in the transitional area between the projection and the bordering area of the transverse surface, respectively. The portion of the radiation totally reflected for the second time is then reflected in the direction of the depression, which in turn fans it.

The invention also provides that radiation reflected by the projection in the direction of the frontal surface is not only fanned in the direction of the light source but is also reflected and fanned by the frontal surface in the direction of the rear surface.

The invention teaches that through constructively simple measures it is possible to refract, reflect and fan out a linear beam of light or one with a an elliptical cross section via a lens in such a way that a reflection the light is reflected not only in the direction of the radiation emitted by the light source, but also back to the light source so that an optical marking can be projected in front of and at least below as well as preferably also behind the light source. In this way the marking is present at least in the area of vertical projection of the light source in the direction of the footprint of the device.

BRIEF DESCRIPTION OF THE DRAWINGS

Additional details, advantages and features of the invention can be derived not only from the claims and the features described therein—on their own and/or in combination with one another, but also from the following description of a preferred embodiment illustrated in the drawing.

Shown are.

DESCRIPTION OF THE PREFERRED EMBODIMENTS

Figure 1:
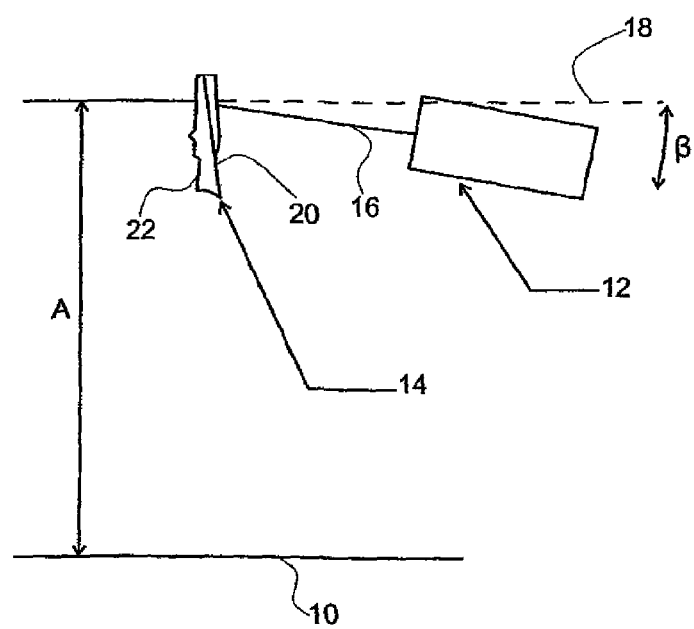
FIG. 1 A schematic diagram of a device for projecting a marking on a boundary surface, FIG. 2 A side view of a lens, FIG. 3 A rear view of the lens shown in FIG. 2, FIG. 4 Lenses of the type shown in FIG. 2 with schematic illustration of radiation refracted, reflected and fanned thereby and FIG. 5 A schematic illustration of the optical path for projecting the marking onto a boundary.

To project lines onto a floor surface 10 of a room for the purpose of aligning tiles, floor plates or other floor coverings to be laid, especially in the field of construction, a device with essential components schematically illustrated in FIG. 1 is used. The device comprises a light source such as the laser diode 12 with optics connected in series to allow a preferably ovular or elliptical cross-section beam, the optical axis 16 of which runs inclined toward the horizontal axis 18, to strike a lens 14. The angle of inclination β is preferably around 2°. However, the teaching of the invention is not restricted to this figure.

The laser beam, in this case the optical axis 16, strikes the lens 14 at a distance A from the floor surface 10, where this distance is preferably around 50 mm. The lens 14 is geometrically designed and aligned with the laser beam, in this case the optical axis 16, so that in the corresponding illustrations of FIGS. 4 and 5 a line is projected onto the floor 10 both in front of and behind the lens and hence also the laser light source 12. For this purpose, the lens 14 features a cuboid geometry with a length L, a width B and a depth T. Exemplary dimensions are: 12 mm≦L≦14 mm, 4 mm≦B≦6 mm and 3 mm≦T≦3.5 mm.

The lens 14 features a frontal surface 20 and a rear surface 22 in relation to the light source 12. Furthermore, a projection 24 with a triangular profile and protruding beyond the rear surface 22 divides the lens 14 into an upper first section 26 and a lower second section 28. The projection 24, which runs the entire width B of the lens 14 and parallel to both the upper and lower boundary surfaces (top surface 30, base surface 32), divides the lens 14 in relation to its height into two approximately equal parts, meaning that the sections 24, 26 are approximately equal in length. The rear surface 22 also features two planar areas 34, 36, which merge at a surface 38. Thus when the lens 14 is in the operating position, the angle between the vertical axis and the upper area 26 is δ, while the angle between the vertical axis and the lower area 28 is γ, where δ<γ.

Running on the frontal surface 20 at the level of the surface 38 is a depression 40, which is of channel-shaped geometry and runs parallel to the projection 24 as well as to the upper and lower boundary surfaces 30, 32.

The laser beam, which preferably features an elliptical cross section, where the major axis can be 3 to 5 mm, for example, and the minor axis can be 1 mm to 1.5 mm smaller than the major axis, strikes the frontal surface 20 of the lens 14, specifically at the upper first section 26. The optical axis 16 preferably intersects the contact surface 42 at an angle α, where α≠90°. Thus the optical axis 16 should intersect the surface 40, namely its area running to the top surface 30, at an obtuse angle.

Figure 2:
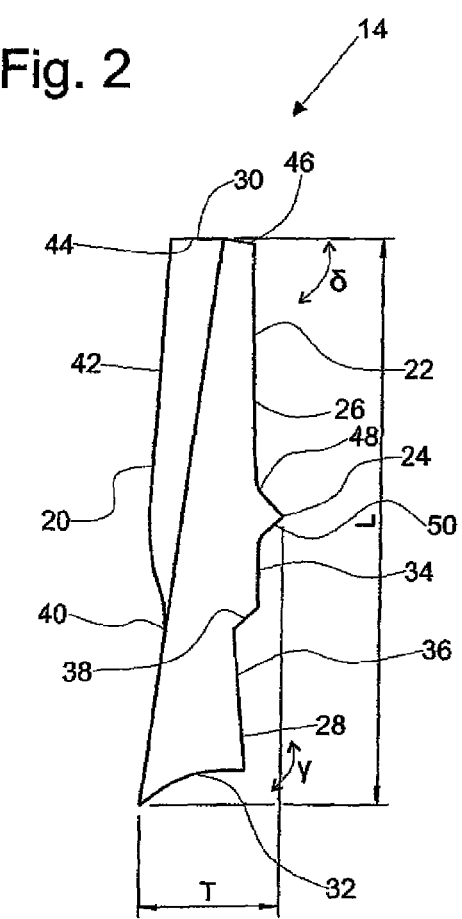
Figure 3:
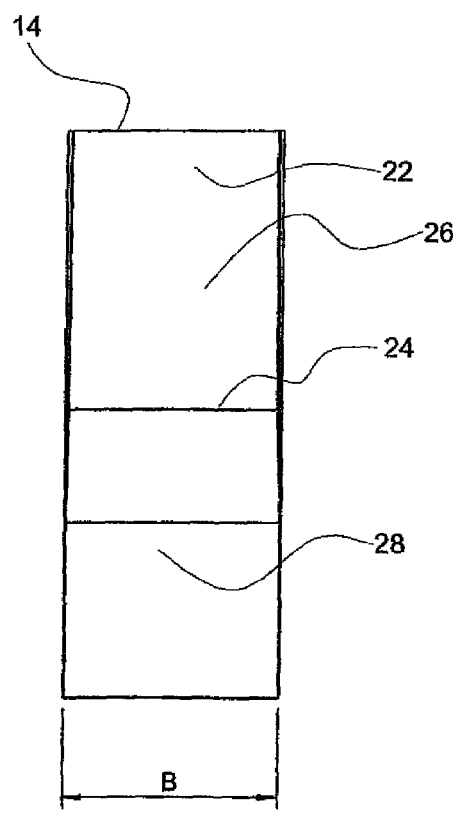

Furthermore, FIG. 2 shows that the upper boundary surface, in this case the top surface 30 of the lens 14, is composed of two sections 44, 46, both of which are planar. Arranged opposite to this surface and exhibiting a concave form is the lower boundary surface, in this case the base surface 32.

Figure 4:
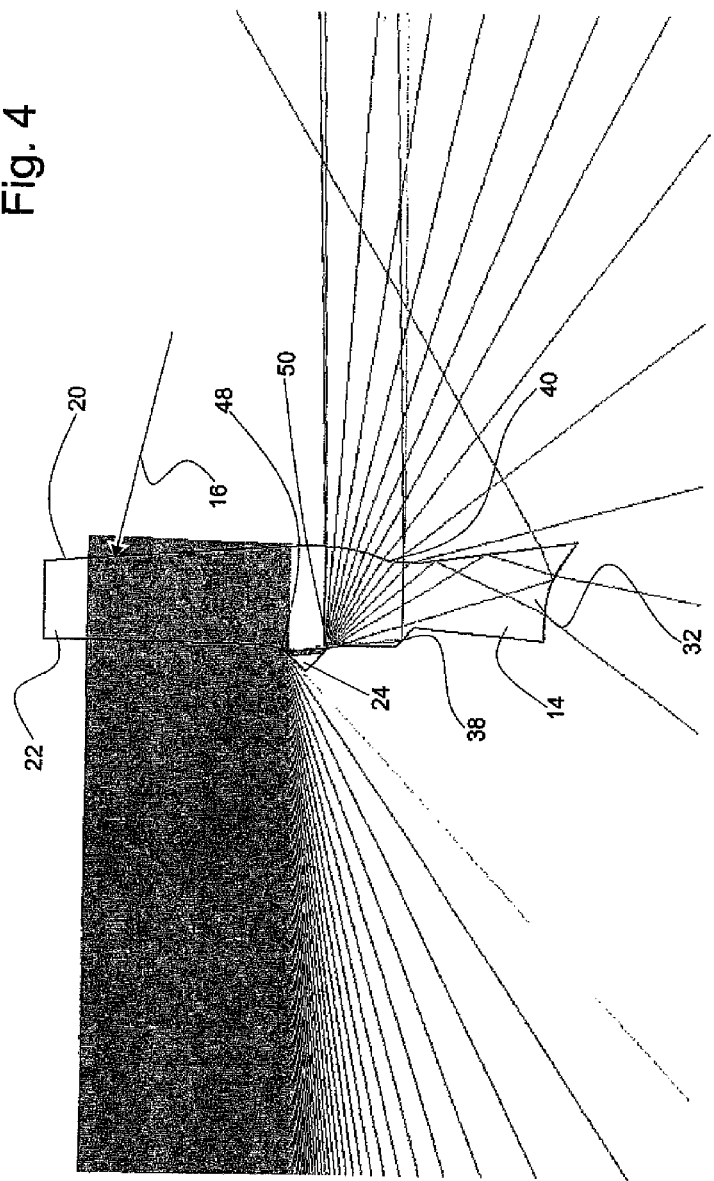
Figure 5:
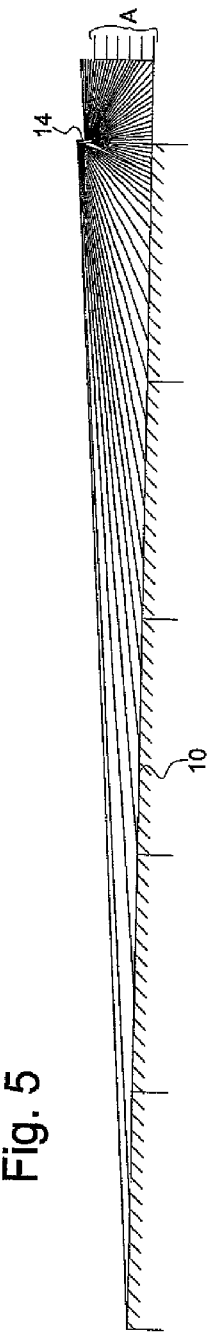

The geometry of the lens 14, its design and its alignment to the optical axis 16 in the operating position facilitate the refraction, reflection and fanning of the striking radiation as illustrated in FIGS. 4 and 5. The line projected onto the floor 10 extends up to 10 m in front of the lens 14. The portion of the optical marking running in the direction of the light source 12 has a length that extends to behind the light source 12, as the schematic illustration of FIG. 5 shows.

FIG. 4 shows the trajectory of the beams of the radiation refracted, reflected and fanned by the lens 14. Here the projection 24 as well as the depression 40 running on the frontal surface 20 are essential for projecting the marking onto the floor surface 10. In this way, the radiation is totally reflected at the respective transitional area between the projection 24 and the bordering area of the rear surface 22 (points 48, 50), to be reflected in the direction of the depression 40 in which the radiation is further fanned. The radiation is also reflected by the inner surface of the surface 38 back into the direction of the light source 12 as well as into the area below it.

A portion of the radiation totally reflected in the area 50 is totally reflected at the frontal surface 20 below the depression 40 and refracted by the base surface 32 of the lens 14 so that the desired fanning of the radiation and thus the projection of the line onto the floor surface 10 is ensured.

Also essential for projecting the marking is the first or upper section 26 of the lens 14 with the transverse boundary surfaces, in this case frontal and rear surfaces 20, 22, that decrease in distance from one another as they approach the top surface 30 and thereby virtually constitute borders of a wedge, the projection 24 on the rear surface 26 dividing the lens 14 into the upper and lower sections 36 and 28 as well as the depression 40 running in the lower section 28 of the frontal surface 20.

The invention claimed is:

1. Device for projecting a linear optical marking onto at least a boundary of a room, comprising:
 a light source that emits light radiation along an optical axis,
 a lens having cuboid geometry connected in series with the light source, which both reflects and refracts the radiation, is penetrated by the optical axis, and comprises a first transverse surface and a second transverse surface, which run at an angle to the optical axis,
 the first transverse surface including a channel-shaped depression and the second transverse surface including a projection, the depression and the projection being arranged such that radiation striking a transitional area between the projection and the second transverse surface is totally reflected, and totally reflected radiation striking the depression can be fanned out, where the optical marking runs to both transverse surfaces of the lens.

2. Device as claimed in claim 1, constructed and arranged for projecting the linear optical marking onto a floor surface of the room.

3. Device as claimed in claim 1, wherein the light radiation is laser radiation.

4. Device as claimed in claim 1, wherein the projection is provided on the second transverse surface, which is a rear surface facing away from the light source.

5. Device as claimed in claim 1, wherein the depression is provided on the first transverse surface, which is a frontal surface of the lens, facing the light source.

6. Device as claimed in claim 1, wherein the lens is composed of a first and second sections, the projection runs in a transitional area between the first and second sections, the first section is of trapezoidal geometry in a sectional plane in which the optical axis penetrates the lens, and the channel-shaped depression is provided in the second section.

7. Device as claimed in claim 6, wherein an additional depression is provided in the second transverse surface opposite the depression, and the second section emanating from the depressions features a trapezoidal geometry with a concave running outer free base surface, constituting a lower outer surface of the lens.

8. Device as claimed in claim 6, wherein the outer free base surface of the first section is designed as a planar upper outer surface of the lens.

9. Device as claimed in claim 8, wherein the outer free base surface is parallel or nearly parallel to the horizontal axis when the lens is in an operating position.

10. Device as claimed in claim 6, wherein the first section has an outer free base surface which is realized as an upper outer surface of the lens composed of multiple planar surfaces, of which at least one is horizontal or nearly horizontal when the lens is in an operating position.

11. Device as claimed in claim 6, wherein the first section on the first transverse surface is inclined toward the optical axis.

12. Device as claimed in claim 6, wherein the lens is aligned with the light source such that the optical axis strikes the first section at an angle α≠90°.

13. Device as claimed in claim 12, wherein the optical axis runs in relation to a horizontal axis at an angle β, where $1° \leq β \leq 3°$.

14. Device as claimed in claim 1, wherein the optical axis intersects the first transverse surface at an area emanating an the upper outer surface of the lens to form an obtuse angle.

15. Device as claimed in claim 1, wherein the lens has a width B, a length L and a depth T, where $2B \leq L \leq 3B$ and/or $2T \leq L \leq 4T$ and/or $1T \leq B \leq 2T$.

16. Device as claimed in claim 1, wherein the projection runs in the center of the second transverse surface.

17. Device as claimed in claim 1, wherein the projection has a triangular-shaped cross section and extends over an entire width of the transverse surface.

18. Device as claimed in claim 1, wherein the second transverse surface is composed of a first area having an angle δ to a vertical axis when the lens is in an operating position and a second area having an angle γ to the vertical axis when the lens is in an operating position, where δ<γ, the projection emanates from the first area, and the second area merges with the first area via a diagonally running surface.

19. Device as claimed in claim 1, wherein the lens is arranged with the channel-shaped depression reflecting the radiation back toward the light source or fanning the radiation spaced from the boundary at a distance A, where 20 mm≦A≦100 mm.

20. Device as claimed in claim 19, wherein 30 mm≦A≦70 mm.

21. Method for projecting a linear optical marking onto at least a boundary of a room by fanning light radiation emitted from a light source and at least partly reflecting and refracting the radiation at or in an optical lens, the radiation being reflected and refracted in such a way that the optical marking is projected both in front of and behind the light source, comprising placing in front of the light source a lens having cuboid geometry with first and second transverse surfaces, which runs at an angle to an optical axis of the radiation striking the lens, the first transverse surface comprising a channel-shaped depression and the second transverse surface comprising a projection, radiation striking a transitional area between the projection and the second transverse surface being totally reflected, and totally reflected radiation striking the depression being fanned out.

22. Method as claimed in claim 21, wherein the boundary is floor surface.

23. Method as claimed in claim 21, wherein the light radiation is laser radiation.

24. Method as claimed in claim 21, wherein radiation is totally reflected by the projection on the second transverse surface which is a rear surface facing away from the light source in the transitional area between the first section of the second transverse surface and the projection, the radiation thus reflected being totally reflected and fanned in a transitional area between the projection and a second section of the second transverse surface and a portion of the fanned radiation is further fanned in the channel-shaped depression provided in the first transverse surface of the lens.

25. Method as claimed in claim 21, wherein the projection and areas of the lens bordering the projection are geometrically adapted to one another such that radiation is totally reflected by a first transitional area between the projection and a bordering area of the second transverse surface and into a second transitional area between the projection and an adjacent area of the second transverse surface, and is totally reflected by the second transitional area toward the first transverse surface.

26. Method as claimed in claim 25, wherein at least a portion of the radiation totally reflected by the second transitional area is reflected in the direction of the depression, where it is then fanned out.

27. Method as claimed in claim 21, wherein radiation reflected by the projection toward the first transverse surface is both fanned in the direction of the light source and reflected and fanned by the first transverse surface in the direction of the second transverse surface.

* * * * *